June 12, 1962  L. F. HANSEN ET AL  3,038,282
CAPSULES OF SOFT PLASTIC CONTAINING GRANULES
Filed July 5, 1960  4 Sheets-Sheet 1
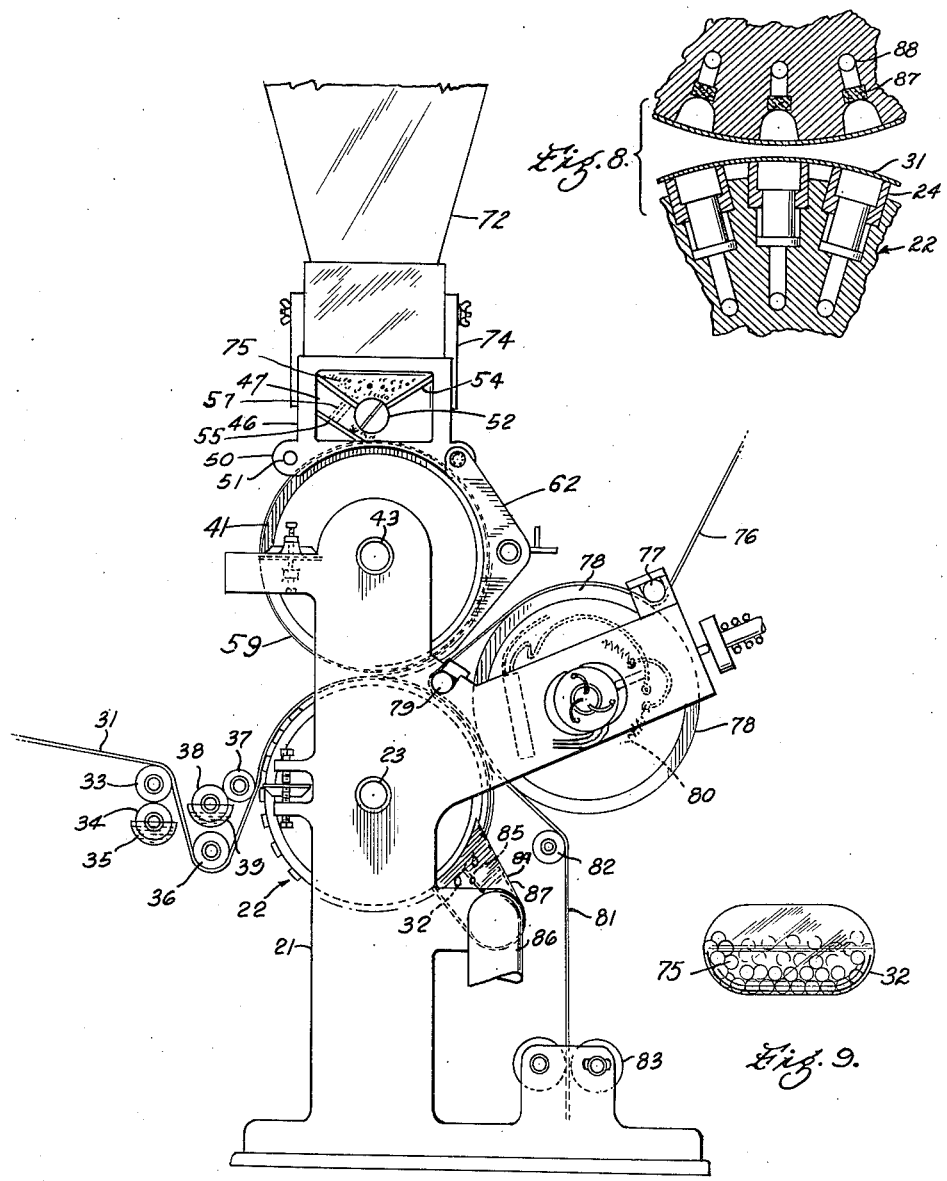
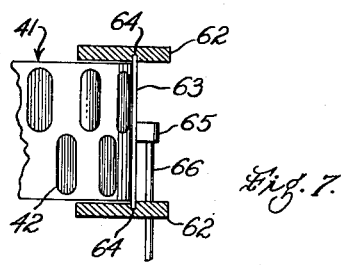
INVENTORS
LLOYD FRANK HANSEN
WARREN JAY SARVIS
BY
Samuel Branch Walker
ATTORNEY.

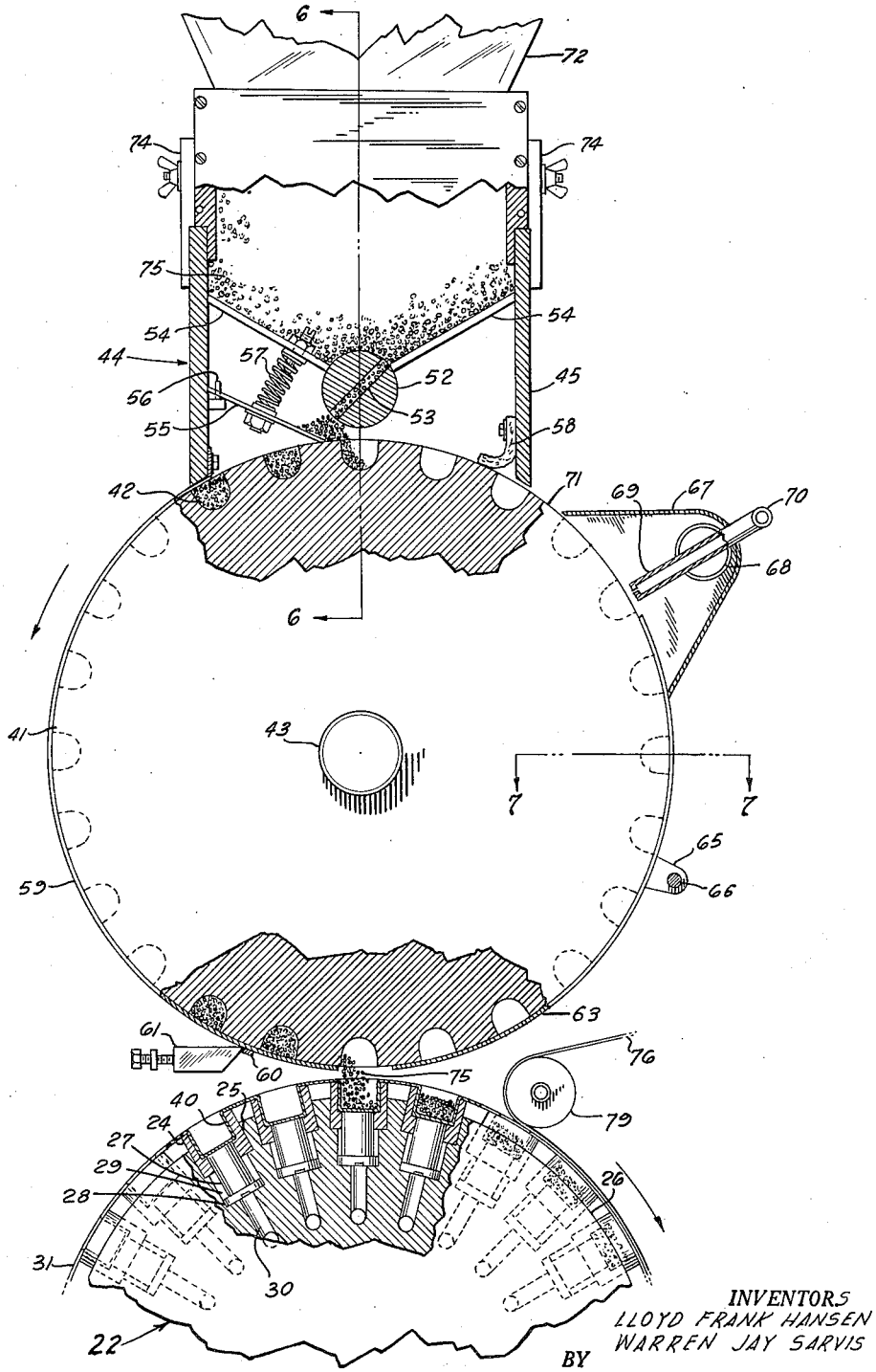

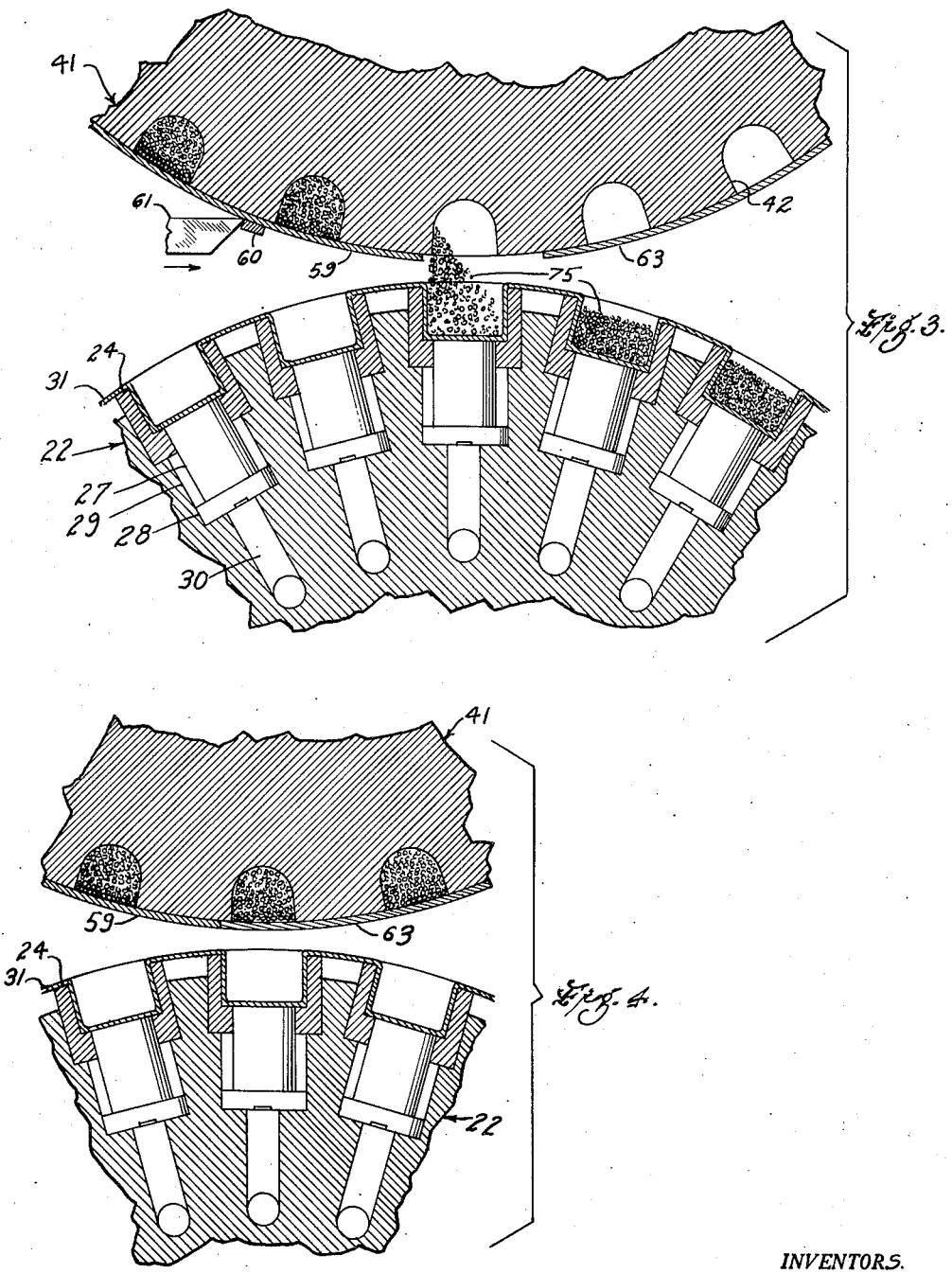

June 12, 1962  L. F. HANSEN ET AL  3,038,282
CAPSULES OF SOFT PLASTIC CONTAINING GRANULES
Filed July 5, 1960  4 Sheets-Sheet 4
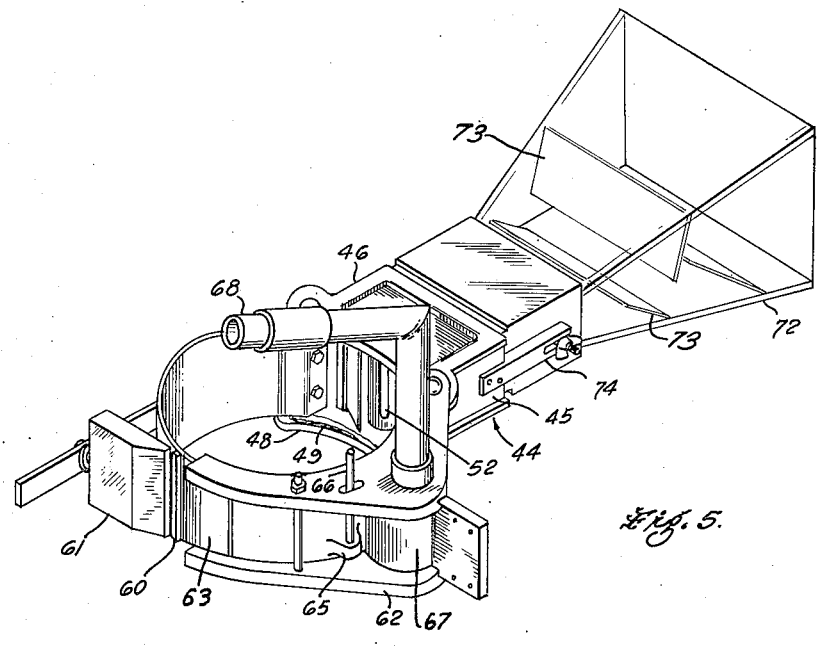
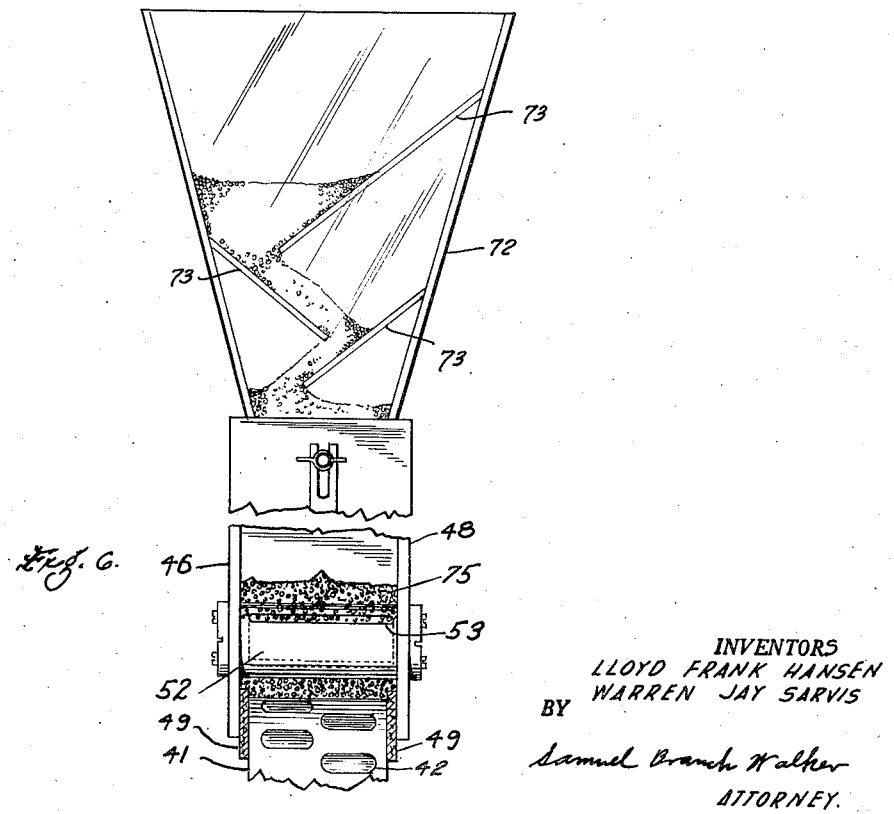
INVENTORS
LLOYD FRANK HANSEN
WARREN JAY SARVIS
BY
Samuel Branch Walker
ATTORNEY.

3,038,282
CAPSULES OF SOFT PLASTIC CONTAINING GRANULES

Lloyd Frank Hansen, New City, and Warren Jay Sarvis, West Haverstraw, N.Y., assignors to American Cyanamid Company, New York, N.Y., a corporation of Maine
Filed July 5, 1960, Ser. No. 40,773
3 Claims. (Cl. 53—28)

This invention relates to the filling of granules in soft plastic capsules, and particularly to an apparatus and method for measuring uniform charges of granules which are too coarse to be vacuum packed as a powder volumetrically, under a uniform minimum granule pressure head, and transferring such charges to plastic strip lined cavities in encapsulation roll systems, and forming soft plastic capsules therefrom.

The present device is adapted to be incorporated into a powder-filling system such as disclosed in United States Patent No. 2,775,080, F. E. Stirn and A. S. Taylor, Method of Forming Powder-and-Liquid Filled Capsules, December 25, 1956, with a minimum of modifications.

Soft plastic capsules are advantageously used as the final packages for many pharmaceutical products for internal consumption and may be used for dyestuffs, pigments, bleaches and other products. For oral administration, gelatin strip plasticized with glycerine has met with the greatest commercial acceptance. Other plastic strip material and other plasticizers may be used, particularly for packages not primarily designed to be taken internally.

Among the machines which have been designed for manufacturing such soft plastic capsules are those described in Patent No. 2,775,080. Die rolls which may be used in the present invention and other encapsulation machines are described at length and claimed in United States Patent No. 2,697,317, Stirn and Taylor, Capsule Forming Die Roll, December 21, 1954.

The transfer of powders, disclosed in said Patent No. 2,775,080 and in Patent No. 2,775,084, Stirn and Taylor, Apparatus for Filling Powder in Capsules, December 25, 1956, is very satisfactory with powders which may be compacted into charge chambers by the use of vacuum.

It is desirable that a machine such as there disclosed be adaptable to the filling of granules.

Granules are the larger particles which may be formed by mixing a powder with a liquid and a binder and then breaking the plastic mass up into discrete particles. Granules may be formed by pressing particles of a powder into small molds and ejecting the particles. Granules may be formed by grinding a therapeutic agent to a powder and coating sugar particles, or the like, with the powder to build up the particle size, using an adhesive such as syrup if necessary, to form what are sometimes called "nonpareil" seeds. Other conventional methods of forming granules may be used. Such granules usually run from about 60 mesh to 12 mesh, passing the United States standard screen sieves having this number of holes per inch, although granules may be formed of a size down to about 100 mesh and may be formed larger than 12 mesh where desired. Conveniently, such granules are individually treated with enteric coatings to delay their absorption when ingested. When granules containing different delay times are mixed, and filled into capsules, capsules are readily formed which give a prolonged therapeutic action by the controlled release of the therapeutic agents.

Additionally, certain medicaments which are preferably administered simultaneously, are incompatible during storage and must be protected from each other if the capsule containing them is to have a satisfactory shelf life. Such medicaments are individually coated, as granules, and filled as coated granules into capsules, whereby the storage stability is enhanced. Sometimes only one of the components needs to be treated with a protective coating.

Such granules are, in general, too coarse to be packed as a powder in a charge measuring chamber by vacuum. Additionally, the granules are frequently fragile and may be readily broken up in a conventional measuring machine. Whereas, the breakage of a few granules is normally not deleterious, the breakage of a considerable number may have an undesired influence on the rate of absorption of the capsule contents. Further, the breakage of an undue number of granules produces a powder so that the capsule can be seen to have a fine powder as well as the coarse granules. Such an appearance is frequently esthetically undesirable.

It has now been found that granules may be filled into soft plastic capsules with a minimum of breakage and with uniform and accurate compaction by feeding the free-flowing granules through a series of baffles, to prevent the build up of pressure of granules on each other, to a measuring roll. Such build up may be termed as granule pressure head, having certain attributes similar to the more common hydrostatic pressure head. The granules, with a minimum of pressure head thereon, are fed through a slotted flow control valve or other orifice into a measuring roll having charge measuring chambers therein, with the charge in each chamber being struck off by a granule doctor which is spring loaded, and adjusted to cause a minimum of granule breakage. The granules are retained in the measuring roll by a charge retaining band which prevents the granules from falling out as the measuring roll rotates, and are discharged in timed, coordinated relationship from the charge measuring chambers into plastic strip lined cavities in a cavity die roll. Fingers may be used to vary the size of the measuring chamber, such as are disclosed in United States Patent No. 2,775,083, Stirn and Taylor, Package Forming and Filling Apparatus, December 25, 1956, see particularly FIGURE 5. The measuring roll may have foraminous areas designed to aid in the injection of the granules, such as more particularly described in Patent 2,775,084, supra, if the granules to be filled exhibit a tendency towards sticking in the charge measuring chambers. Conveniently, a transfer cut-off gate is in contact with the measuring roll and may be angularly positioned to control the transfer of granules as desired.

Additional details of the granules encapsulation system of the present invention and its operation are shown in the accompanying drawings and the description thereof, in which:

FIGURE 1 is a front view of the granule encapsulation machine.

FIGURE 2 is a view, in partial section, of the measuring roll and the cavity die roll, showing the filling of charge measuring chambers and the transfer of granule charges.

FIGURE 3 is an enlarged view of the transfer of granules from the measuring roll to the strip lined cavity die roll.

FIGURE 4 is a view similar to that of FIGURE 3, but in which the transfer cut-off gate is positioned to prevent transfer of granules from the measuring roll to the cavity die roll.

FIGURE 5 is a pictorial view of the granule hopper, the associated charge retaining band, and the transfer cut-off gate.

FIGURE 6 is a side view of the granule hopper and the charge measuring roll taken along line 6—6 of FIGURE 2.

FIGURE 7 is a partial sectional view along line 7—7 of FIGURE 2, showing the transfer cut-off gate and part of the measuring roll.

FIGURE 8 is a view similar to FIGURE 3, showing a modification of the measuring roll having filters at the bottom of the charge measuring chambers leading to a charge manifold to permit the use of gas pressure in aiding the ejection of granule charges.

FIGURE 9 is the completed granule-filled capsule, shown with a transparent plastic shell.

Die Roll System

In FIGURE 1 is shown part of a capsule-filling machine showing a frame 21 which supports a cavity die roll 22 on a cavity die roll axle 23. The remainder of the machine, including the plastic strip supply, is conventional. The cavity die roll may be of one piece, but more conveniently is of built-up construction having a plurality of capsule cavity inserts 24 pressed into slots 25 in the cavity die roll blank 26. Under each capsule cavity insert there is at least one capsule ejector plug 27 which has a capsule ejector piston 28 which operates in a capsule ejector piston cylinder 29. The plug and the piston are loose enough to allow gas passage. A gas passage 30 leads to a valve system for reducing the pressure in the capsule cavity insert to draw a first plastic strip 31 into the capsule cavity insert. At a selected part of the travel of the cavity die roll, gas pressure acting through the same gas passage 30 raises the capsule ejector piston 28 and through the capsule ejector plug 27 presses out and ejects the granule-filled capsule 32. The details of a suitable cavity die roll and its method of operation are disclosed in said Patent 2,697,317, supra, a description of which is here incorporated by this reference.

The first plastic strip 31 is fed from a suitable source over an oiler roll 33. The oiler roll, in turn, contacts an oil feed roll 34 which rotates in an oil bath 35. The first plastic strip then passes under a positioning roll 36 and past an inside coating roll 37. The inside coating roll 37 is fed by an inside coating feed roll 38, which rotates in a coating trough 39. An inside coating may be applied to the surface of the first plastic strip which is to become the inside surface of one half shell of the capsule to protect the plastic strip material and the capsule contents from each other. Preferably, the oiler roll and the inside coating roll are power driven. Conveniently, the plastic strip is of gelatin plasticized with glycerine and containing some water, and the coating material may be of a beta-pinene polymer such as is described in United States Patent 2,770,571, Vance and Yen, Soft Gelatin Capsule Provided With Internal Barrier, November 13, 1956. The first plastic strip 31 is fed onto the surface of the cavity die roll. Reduced pressure inside of the capsule cavity inserts pulls the plastic strip down into the capsule cavity insert to form a cup-shaped cavity 40 in the gelatin strip.

Granule Measuring System

Above the cavity die roll 22 is a measuring roll 41. In the embodiments illustrated in FIGURES 1 to 7, inclusive, the measuring roll differs from the construction shown in United States Patent 2,775,080 in that there is no gas inlet or gas inlet filter and associated gas passages at the bottom of the charge measuring chamber 42. Most granules are sufficiently free flowing that pressure is not necessary nor desirable for either filling the charge measuring chamber with granules or discharging the granules from the charge measuring chamber. Conveniently, the charge measuring chamber is curve-bottomed to avoid having sharp corners in which powder from fractured granules can accumulate. It is preferred that the charge measuring chambers have a slight taper so that once the granules have started to fall out of the measuring chamber the charge is falling through a path of expanding cross section and hence is less apt to bridge or jam.

The measuring roll 41 rotates about a measuring roll axle 43. Conveniently, both the cavity die roll and the measuring roll are fixed on their respective axles, and said axles are rotated in timed relationship by a mechanical drive. Such drive is conventional and hence is not illustrated in detail. The measuring roll may be of metal so that it will stand considerable wear. Plastics such as polytetrafluorethylene may be used, and measuring rolls of such material have an advantage in that very few materials will stick to such a plastic. Plastic rolls are easily formed.

Above the measuring roll 41 is a granule hopper 44. The granule hopper has vertical hopper sides 45, which are shaped on each side to fit close to but not touch the measuring roll. As shown in FIGURES 1 and 5, the front of the granule hopper 46 overlaps the front of the measuring roll. The front of the granule hopper has a granule feed window 47 of transparent plastic. The feeding of the granules through the hopper can be observed through this granule feed window so that the feed rate of the granules may be adjusted during operation. The rear of the granule feed hopper 48 is conveniently of metal. A felt strip 49 is attached to both the front and the rear members of the granule feed hopper so that a resilient member is present between the front and the rear of the hopper and the front and the rear of the measuring roll. As shown in FIGURES 1 and 5, the front and the rear of the granule feed hopper overlap at least slightly the front and the rear of the measuring roll 41, and form a granule-tight seal therewith. Conveniently, the granule hopper has integral ears 50 which fit over hopper support bars 51, on the encapsulation machine. The granule hopper and the granule measuring roll are interchangeable with powder feed hoppers, and powder measuring rolls, so that a single encapsulation machine can be used for the encapsulation of both powders and granules.

Inside the granule hopper and rotatably mounted in the front and rear of the granule hopper is a slotted flow control valve 52. The slotted flow control valve is parallel to the measuring roll axle and is mounted so that it can be turned about its axis. The slotted flow control valve is a round shaft through which passes a granule slot 53. Extending from adjacent the slotted control valve to the vertical hopper 45 is the sloped hopper bottom 54 which forms a seal with the flow control valve so that granules in the hopper are fed towards the slotted flow control valve, and the position of the slot in the slotted flow control valve may be adjusted by turning so that the rate of feed of granules is readily controlled. The slot may be turned so as to be partially obstructed by the sloped hopper bottom 54 to control the feed rate, and may be turned to completely shut off the flow.

The slotted flow control valve is close to, but does not touch, the measuring roll. Granules flow down through the slot in the slotted flow control valve until a small pile of granules is built up on the measuring roll, at which time the small pile of granules blocks the flow of additional granules through the slot.

Under the sloped hopper bottom 54, in the direction of measuring roll rotation, is a granule doctor 55. The granule doctor is mounted on a doctor support pin 56, so that the doctor is free to move about the pin on all three axes. The doctor is pressed against the measuring roll 41 by a doctor spring 57. The doctor spring permits the doctor to twist slightly to compensate for any lack of uniformity in the cylindrical surface of the measuring roll, and hold the doctor in sliding contact with the measuring roll at all times. Because the doctor is mounted with a spring, the doctor will slide on the roll surface, without leaving crevices, and only a very small number of granules are caught between the edges of the charge measuring chambers and the doctor. Most granules are pushed back by the doctor against the very low granule pressure head. The percentage of broken granules is so small as to be negligible.

At the side of the granule hopper, towards which the measuring roll rotates, is a felt wiper 58. This wiper wipes granules or dust particles from the surface of the measurbetween the seal roll 78 and the second plastic strip 76, and moving the positioning roll into position. After threading both strips, the seal roll is tightened against the cavity die roll until a good seal and uniform cut-out is obtained. Vacuum is then applied to the cavity die roll to draw the first plastic strip down into the capsule cavity die inserts 24 giving air-filled capsules. When the seals meet approval and the coating, printing and other allied operations are satisfactory, the slotted flow control valve is turned to permit the flow of granules sufficient to build up slightly against the doctor blade and completely fill each charge measuring chamber.

In such operation, none of the medicament is fed until all preliminary operations are completed so that the first granule-containing capsules should be acceptable for use.

If during operation at any time it is desired to cut off the flow of granules, as for example should a strip break, the gate control lever is moved to shove the transfer cut-off gate against the charge retaining band, which immediately cuts off the flow of granules out of the measuring roll. The slotted flow control valve can then be turned off. The air and vacuum in the vacuum shield can be turned off, and the measuring roll is permitted to idle with filled measuring chambers until encapsulation can again be started.

For delays of any magnitude, the air and vacuum are left on, the measuring chambers cleaned out, and the machine restarted as above. Any granules removed by vacuum can be recovered from the dust trap in the vacuum line.

Alternate Measuring Roll

As shown in FIGURE 8, an alternating construction for the charge measuring roll is to have a filter 87 and a gas passage 88 under each charge measuring chamber. With such construction, the charge measuring roll is substantially the same as disclosed in United States Patent 2,775,080, supra. The same rolls may be used as used for powders. Granules, particularly those containing hygroscopic substances, may pick up enough moisture from the air during encapsulation so as to exhibit a tendency to stick to themselves and to the charge measuring roll. For such instances, a blast of ejection air through the gas passage 88 and the filter 87 aids in transfer of the granules to the cup-shaped cavities in the first plastic strip.

In the configuration shown in FIGURE 8, the first plastic strip is not yet being drawn into the capsule-forming inserts, and is shown lying on the top surface thereof to represent a phase of start-up operations.

For various quantities of fill, different measuring rolls may be used, or adjustable size charge measuring chambers. One method for varying measuring chamber size is the use of a band which is of a thickness of about 0.005 to 0.030 inch, and concentric with the measuring roll 41 and of equal face width, and having apertures to correspond to the charge measuring chambers, so that when the band is fitted about the measuring roll, its diameter is increased slightly and, correspondingly, the effective capacity of the charge measuring chambers.

The use of the present machine and method in conjunction with various forms of forming plastic strips, plastic strip compositions, internal and external printing and coating and allied operations, are apparent to those skilled in the art.

Such auxiliary operations are usable in conjunction with the present invention as defined in the appended claims.

We claim:

1. In a machine for filling uniform granule charges into soft plastic capsules, a cavity die roll having a plurality of spaced apart rimmed capsule-forming cavities therein, means to supply a plastic strip onto the surface of said cavity die roll, means associated with said cavity die roll to draw the plastic strip down into said cavities, thereby forming strip-lined cavities, a rotatable measuring roll having a plurality of spaced apart tapered charge measuring chambers having a size and shape such that the individual contents can discharge in spaced, timed relationship into cooperating individual strip-lined cavities in the cavity die roll, means to rotate said cavity die roll and said measuring roll in adjustable timed relationship, a granule hopper above the rotatable measuring roll, a rotatable slotted flow control valve having a slot parallel to the axis of rotation of said rotatable measuring roll to control the flow of granules from the granule hopper to the rotatable measuring roll, the axis of rotation of said rotatable valve and the axis of rotation of said measuring roll being parallel, a resiliently mounted doctor blade riding on the surface of the measuring roll, inclined in a direction away from the roll in the direction of measuring roll rotation, a charge retaining band adjacent and positioned against the rotatable measuring roll from near the doctor blade to the granule discharge position, means to adjust said band against said measuring roll, a transfer cut-off gate in concentrically movable relationship with the rotatable measuring roll, mounted so that the leading edge of said gate may be moved to rest against the trailing edge of said charge retaining band to cut-off granule transfer from the said measuring roll to the cavity die roll, and moved away from the trailing edge of said band at a different time to permit granule transfer, a measuring roll cleaning jet, and a measuring roll cleaner vacuum shield.

2. In a machine for filling uniform granule charges into soft plastic capsules, a cavity die roll having a plurality of spaced apart rimmed capsule-forming cavities therein, means to supply a plastic strip onto the surface of said cavity die roll, means associated with said cavity die roll to draw the plastic strip down into said cavities, thereby forming strip-lined cavities, a rotatable measuring roll having a plurality of spaced apart tapered charge measuring chambers having a size and shape such that the individual contents can discharge in spaced, timed relationship into cooperating individual strip-lined cavities in the cavity die roll, means to rotate said cavity die roll and said measuring roll in adjustable timed relationship, a granule hopper above the rotatable measuring roll, a rotatable slotted flow control valve having a slot parallel to the axis of rotation of said rotatable measuring roll to control the flow of granules from the granule hopper to the rotatable measuring roll, the axis of rotation of said rotatable valve and the axis of rotation of said measuring roll being parallel, a resiliently mounted doctor blade riding on the surface of the measuring roll, inclined in a direction away from the roll in the direction of measuring roll rotation, a charge retaining band adjacent and positioned against the rotatable measuring roll from near the doctor blade to the granule discharge position, means to adjust said band against said measuring roll, and a transfer cut-off gate in concentrically movable relationship with the rotatable measuring roll, mounted so that the leading edge of said gate may be moved to rest against the trailing edge of said charge retaining band to cut-off granule transfer from the said measuring roll to the cavity die roll, and moved away from the trailing edge of said band at a different time to permit granule transfer.

3. In a method of manufacturing plastic capsules containing a premeasured quantity of granules having a size larger than 100 mesh comprising, uniformly and continuously advancing a first plastic strip, forming cup-shaped cavities in said strip, depositing the capsule contents in said cup-shaped cavities, placing a second plastic strip over the granule-filled, cup-shaped cavities and pressing together to simultaneously cut out and seal the two strips together around the peripheries of the cup-shaped cavities, the improvement which comprises: feeding the granules over a plurality of baffles the slope of each of which is greater than the angle of repose of the ing roll and serves as an additional seal against the escape of granules backwards.

Fastened to the side of the granule hopper in the direction of roll rotation is a charge retaining band 59. The charge retaining band has the same curvature as the surface of the measuring roll, and is positioned to rest closely against the surface of the measuring roll. At the lower end of the charge retaining band is a tension strip 60. This is merely a small strip or clip attached to the band against which a tension adjusting block 61 rests. The tension adjusting block is moved in or out to control the firmness with which the charge retaining band is drawn against the measuring roll. The charge retaining band is adjusted tight enough to prevent loss of granules, but is loose enough to reduce friction. The end of the charge retaining band is close to the line of centers between the measuring roll 41 and the cavity die roll 22, called the bite of the rolls. Thus, granules are held in the charge measuring chambers 42 until close to the point of closest approach between these two rolls, and are then dropped from the measuring chamber into a mated, corresponding cup-shaped cavity 40 in the first plastic strip. The capacity of the measuring chamber is such that a desired quantity of granules is dropped into each cup-shaped cavity. The configuration of the measuring chambers is preferably such that the granules fall directly into the cup-shaped cavity without any of them spilling on the surface of the plastic strip, which stretches between the rims of the cavity die inserts.

Transfer Cut-Off Gate

On the side of the measuring roll away from the charge retaining band, and which during filling operations has empty charge measuring chambers, are support blocks 62. In these support blocks is a transfer cut-off gate 63. The transfer cut-off gate is a strip which rests closely against the surface of the measuring roll. It is supported in gate grooves 64 in the support blocks so that the transfer cut-off gate may be slid circumferentially into contact with the charge retaining band 59, which prevents granules from falling out of the charge measuring chambers when so desired by the operator. The position of the cut-off gate is controlled by a gate control arm 65 in which a gate control lever 66 is mounted. The lever is used to control the position of the transfer cut-off gate during operation.

Measuring Roll Cleaner

Also mounted in the support blocks is a vacuum shield 67 which extends down to adjacent the measuring roll. A vacuum line 68 conducts air from within the vacuum shield to a dust collector and vacuum source. Inside the vacuum shield is an air lance 69. The air lance consists of two sheets of metal with a fine slit between them, which slit is directed against the surface of the measuring roll. Compressed air from an air line 70 is directed through the air lance against the surface of the measuring roll, which thus displaces any particles of dust or granules which may have adhered to the surface of the measuring roll, or have become stuck in the measuring chambers. An inspection gap 71 between the vacuum shield 67 and vertical hopper side 45 permits inspection of the measuring roll to be sure that all particles are removed.

Granule Hopper and Baffles

Above the granule hopper 44 is an upper granule feed hopper 72. This feed hopper has divergent sides and has mounted therein a plurality of baffles 73 so that granules flow from each baffle to the baffle below, and are free flowing with a minimum of granule pressure head. Even if the top of the upper granule feed hopper is completely filled with granules, the baffles prevent the build up of pressure against the slotted flow control valve 52, and hence the pressure tending to feed granules through the slot in the flow control valve is substantially uniform at all times.

The slope of each baffle is greater than the angle of repose for the granules being fed. A pile of granules builds up above each baffle until the top slope is equal to the angle of repose, at which point the granules quit flowing and block additional feeding. Thus, a variation in the level of granules in the hopper has little effect on the granule pressure head to the slotted flow control valve.

The upper granule feed hopper is attached to the granule feed hopper by upper hopper supports 74. Preferably, the upper granule feed hopper is of a transparent material, such as polystyrene, which permits the observance of the granule feed through the hopper baffles. With free flowing granules, no trouble is to be expected. If the granules exhibit a tendency to stick, the angles of the baffles may have to be increased, and the hopper may have to be vibrated occasionally or continuously by hand, or by a suitable mechanical vibrator.

Sealing of Capsules

After the cup-shaped cavities 40 are filled with the granules 75, a second plastic strip 76 is fed under a hold-down roll 77 over a seal roll 78 and over a positioning roll 79. The second plastic strip may be oiled, and inside coated as in the first plastic strip. Either or both may be printed or ornamented with a printer such as disclosed in United States Patent 2,929,320, L. F. Hansen and R. Glorig, Machine for Marking Capsules, March 22, 1960.

The temperature of the seal roll is controlled by a seal roll heat control means 80, which may consist of a thermostat and electrical heater so that the second plastic strip is warmed to a desired value and then fed into contact with the first plastic strip by the positioning roll 79. The positioning roll is necessary to feed the second plastic strip into contact with the granule filled, cup-shaped cavities in the first plastic strip at a point not more than about 30° from the top center of the cavity die roll and preferably less. The positioning roll is as near to the bite of the measuring roll and the cavity die roll as roll diameters permit, so that the granules do not start to fall out of the cup-shaped cavities before the covering second plastic strip is placed over these granule-filled cavities as would occur if the second plastic strip were placed by the seal roll.

The seal roll itself presses the two plastic strips against the rims on the surface of the cavity die roll cutting out and sealing together these two plastic strips and separating the cut-out, sealed together portions from the residual web 81 in accordance with conventional practice. The residual web feeds over an idler roll 82 and is drawn off by take-off rolls 83. The completed capsules 32 are picked up in a capsule shield 84 where they may be knocked out of the cavity roll by a stripper 85 which is a rotating fabric or brush which serves to knock the capsules off the surface of the die roll as they are raised by the capsule ejector plugs. A pneumatic conveyor duct 86 carries the completed capsules from the granule encapsulation machine.

Operation

In operation, the machine is started up by turning the slotted flow control valve so as to prevent granules from flowing out of the hopper, after which the hopper may be filled with granules. The plastic strips, conveniently of gelatin, glycerine and water, are formed by casting the plastic mixture on a casting surface, partially solidifying, stripping the partially solidified strip, and feeding through the oiler and coater, then over the cavity die roll. No vacuum is used in the cavity die roll. After the first plastic strip is feeding smoothly through the machine, the second plastic strip is fed under the hold-down roll 77 over the seal roll 78 and over the positioning roll 79. Conveniently, the positioning roll 79 is readily removable so that it may be positioned after the second strip is being fed by inserting the positioning roll granules, and the granules on each of the lower of which blocks additional granule feeding, whereby the quantity and slope of granules on the lower baffles becomes uniform thereby resulting in a uniform granule pressure head, through a metering slot, until a small pile of granules is built up on the measuring roll, and into charge measuring chambers in a measuring roll, striking off the granules with low back pressure to avoid fracture of granules, retaining the granules in separate, individual, spaced, charge measuring chambers in the measuring rolls until the measuring roll is rotated to a granule transfer position, and transferring the granules into individual cup-shaped cavities.

References Cited in the file of this patent

UNITED STATES PATENTS

| | | |
|---|---|---|
| 1,390,383 | Powell | Sept. 13, 1921 |
| 2,324,574 | Gans | July 20, 1943 |
| 2,546,733 | Enestvedt | Mar. 27, 1951 |
| 2,697,317 | Stirn et al. | Dec. 21, 1954 |